US012142917B2

(12) United States Patent
Hisano et al.

(10) Patent No.: US 12,142,917 B2
(45) Date of Patent: Nov. 12, 2024

(54) POWER CONTROL DEVICE AND POWER SUPPLY ALLOCATION METHOD

(71) Applicant: RKC INSTRUMENT INC., Tokyo (JP)

(72) Inventors: Shinya Hisano, Tokyo (JP); Tomoyoshi Fukunaga, Tokyo (JP); Hirotaka Tomita, Tokyo (JP); Yoshiki Arata, Tokyo (JP); Seigo Hirano, Tokyo (JP)

(73) Assignee: RKC INSTRUMENT INC., Tokyo (JP)

( * ) Notice: Subject to any disclaimer, the term of this patent is extended or adjusted under 35 U.S.C. 154(b) by 434 days.

(21) Appl. No.: 17/612,012

(22) PCT Filed: Jun. 4, 2019

(86) PCT No.: PCT/JP2019/022126
§ 371 (c)(1),
(2) Date: Nov. 17, 2021

(87) PCT Pub. No.: WO2020/245901
PCT Pub. Date: Dec. 10, 2020

(65) Prior Publication Data
US 2022/0216694 A1 Jul. 7, 2022

(51) Int. Cl.
*H02J 3/00* (2006.01)
*H02J 3/14* (2006.01)

(52) U.S. Cl.
CPC ............. *H02J 3/003* (2020.01); *H02J 3/14* (2013.01)

(58) Field of Classification Search
CPC .......... H02J 3/003; H02J 3/14; H02J 2310/14; H02J 2310/60; H02J 2310/62;
(Continued)

(56) References Cited

U.S. PATENT DOCUMENTS

| 4,819,180 A | * | 4/1989 | Hedman | ........... | H02J 13/00002 |
| | | | | | 700/291 |
| 8,996,140 B2 | * | 3/2015 | Goto | ....................... | H02J 3/144 |
| | | | | | 713/320 |

(Continued)

FOREIGN PATENT DOCUMENTS

| JP | H11-262174 A | 9/1999 |
| JP | 2011-205731 A | 10/2011 |
| JP | 2012-023824 A | 2/2012 |

OTHER PUBLICATIONS

Korean Request for the Submission of an Opinion for Korean Patent Application No. 10- 2021-7034912, 4 pages.
(Continued)

*Primary Examiner* — M. N. Von Buhr
(74) *Attorney, Agent, or Firm* — FROST BROWN TODD LLP (57) ABSTRACT

The power control device performs power supply to each of a plurality of loads (231 to 234) by a time-proportional control, where a maximum load factor and a current value or a power value during on-control are made to correspond to each of the plurality of loads. The power control device 1 is characterized by being provided with an automatic power supply allocation unit 12 that performs: processing of calculating a combination of loads in which a total value of the current value or the power value during the on-control, which are made to correspond to the respective loads, does not exceed a limiter value that specifies an upper limit to the total of the current value or the power value output to the plurality of loads; processing of setting a period in which the respective loads in the combination are simultaneously on-controlled and subtracting the period from the maximum load factor of each of the loads in the combination; and automatic allocation processing of power supply to each (Continued)

load by repeating each of the above processing until all maximum load factors of the respective loads become zero.

4 Claims, 7 Drawing Sheets

(58) Field of Classification Search
CPC ... Y02B 70/3225; Y04S 10/50; Y04S 20/222; G05F 1/66; G05F 9/5094
See application file for complete search history.

(56) References Cited

U.S. PATENT DOCUMENTS

| | | | |
|---|---|---|---|
| 9,523,992 B2 * | 12/2016 | Gotoh | H02J 3/14 |
| 2013/0285448 A1 * | 10/2013 | Yoshinaga | H02J 3/32 |
| | | | 307/22 |
| 2014/0074307 A1 * | 3/2014 | Matsuyama | H04L 12/2827 |
| | | | 700/295 |

OTHER PUBLICATIONS

International Search Report and Written Opinion dated Aug. 20, 2019, for International Application No. PCT/JP2019/022126, 4 pages.
Japanese Notification of Reasons for Refusal dated May 30, 2022, for Application No. 2021-524531, 3 pages.

* cited by examiner

| ch | Output limiter [%] | Heater current value [A] |
|---|---|---|
| 1 | 30 | 3 |
| 2 | 40 | 6 |
| 3 | 60 | 6 |
| 4 | 70 | 2 |

Peak current set value = 9 [A]

main : ch3

| | Output ch | | | | Current value [A] | | | | Output limiter [%] | | | | Total current value | |
|---|---|---|---|---|---|---|---|---|---|---|---|---|---|---|
| Pattern 1 | 1 | 2 | 3 | 4 | 3 | 6 | 6 | 2 | 30 | 40 | 60 | 70 | 17 | FALSE |
| Pattern 2 | 3 | 1 | 2 | | 6 | 3 | 6 | | 60 | 30 | 40 | | 15 | FALSE |
| Pattern 3 | 3 | 1 | 4 | | 6 | 3 | 6 | | 60 | 30 | 70 | | 11 | FALSE |
| Pattern 4 | 3 | 2 | 4 | | 6 | 6 | 2 | | 60 | 40 | 70 | | 14 | FALSE |
| Pattern 5 | 3 | 1 | | | 6 | 3 | | | 60 | 30 | | | 9 | TRUE |
| Pattern 6 | 3 | 2 | | | 6 | 6 | | | 60 | 40 | | | 12 | FALSE |
| Pattern 7 | 3 | 4 | | | 6 | 2 | | | 60 | 70 | | | 8 | TRUE |

FIG. 4(b)

main : ch3

| | Output ch | | | Current value [A] | | | Output limiter [%] | | | Total current value | |
|---|---|---|---|---|---|---|---|---|---|---|---|
| Pattern 1 | 3 | 2 | 4 | 6 | 6 | 2 | 60 | 40 | 70 | 14 | FALSE |
| Pattern 2 | 3 | 2 | | 6 | 6 | | 60 | 40 | | 12 | FALSE |
| Pattern 3 | 3 | 4 | | 6 | 2 | | 60 | 70 | | 8 | TRUE |

FIG. 4(c)

main : ch2

| | Output ch | | Current value [A] | | Output limiter [%] | | Total current value | |
|---|---|---|---|---|---|---|---|---|
| Pattern 1 | 2 | 4 | 6 | 2 | 40 | 70 | 8 | TRUE |

| ch | Remaining output | Portion to be output in the period | Remainder |
|---|---|---|---|
| 1 | 30 | 30 | 0 |
| 2 | 40 | 0 | 40 |
| 3 | 60 | 30 | 30 |
| 4 | 70 | 0 | 70 |
| | Ratio of output cycle (T) where output is determined | | 30 |

FIG. 5(a)

| ch | Remaining output | Portion to be output in the period | Remainder |
|---|---|---|---|
| 1 | 0 | 0 | 0 |
| 2 | 40 | 0 | 40 |
| 3 | 30 | 30 | 0 |
| 4 | 70 | 30 | 40 |
| | Ratio of output cycle (T) where output is determined | | 60 |

FIG. 5(b)

| ch | Remaining output | Portion to be output in the period | Remainder |
|---|---|---|---|
| 1 | 0 | 0 | 0 |
| 2 | 40 | 40 | 0 |
| 3 | 0 | 0 | 0 |
| 4 | 40 | 40 | 0 |
| | Ratio of output cycle (T) where output is determined | | 100 |

|     | 10 | 20 | 30 | 40 | 50 | 60 | 70 | 80 | 90 | 100 |
|-----|----|----|----|----|----|----|----|----|----|-----|
| ch1 | ON | ON | ON |    |    |    |    |    |    |     |
| ch2 |    |    |    |    |    |    | ON | ON | ON | ON  |
| ch3 | ON | ON | ON | ON | ON | ON |    |    |    |     |
| ch4 |    |    |    | ON | ON | ON | ON | ON | ON | ON  |

FIG. 7

POWER CONTROL DEVICE AND POWER SUPPLY ALLOCATION METHOD

TECHNICAL FIELD

The present invention relates to a power control device, a power supply allocation method, and a power supply allocation program for performing power supply to each of a plurality of loads by time-proportional control.

BACKGROUND ART

For example, in an apparatus such as a semiconductor manufacturing apparatus or an injection molding machine, a plurality of heaters (loads) is provided for maintaining a material or a product at a predetermined temperature.

On a method of controlling power supply to such a plurality of heaters (loads), Patent Document 1 discloses a technique in which power is supplied in a time divisional manner so that power supply to two or more loads is not turned on simultaneously, thereby reducing capacity and size of a power supply facility.

PRIOR ART PUBLICATION

Patent Document

[Patent Document 1] Japanese Patent Application Publication H11-262174

SUMMARY OF THE INVENTION

Problems to be Solved by the Invention

One control method used to supply power to a plurality of loads is time-proportional control. Time-proportional control is a method of supplying desired power by changing the ratio of ON and OFF periods of power supply in a predetermined cycle.

For example, in a heater for maintaining a material, a product, etc. as given above at a predetermined temperature, an output of each heater is in a stable state in the temperature maintaining state after the temperature rise, and therefore the ratio of ON/OFF power supply periods to each heater is at a constant value. Namely, in the power supply to each heater, certain ON period and OFF period exist.

If the ON periods of the power supply to the heaters overlap, the current (total value of currents flowing through each heater) in such periods increases, and therefore, power equipment having a capacity capable of withstanding such increase is required. On the other hand, if it is possible to control power so that the ON periods do not overlap as much as possible so that current value or power value falls within a predetermined upper limit value, reduction of capacity and size of the power supply facility can be achieved.

In view of the foregoing, it is an object of this invention to provide a power control device and a power supply allocation method that facilitate allocation of power supply to each of a plurality of loads so that a current value or a power value falls within a predetermined upper limit value in power control in which power supply to each of the loads is performed by time-proportional control.

Means for Solving the Problem (Configuration 1)

A power control device that performs power supply to each of a plurality of loads by a time-proportional control, in which a maximum load factor and a current value or a power value during ON-control are associated with each of the plurality of loads, the power control device including an automatic power supply allocation unit that performs: a processing of calculating a combination of the loads in which a total value of a current value or a power value during ON-control associated with each of the loads does not exceed a limiter value that specifies an upper limit to a total of a current value or a power value output to the plurality of loads; a processing of setting a period in which each load of the combination is simultaneously ON-controlled and subtracting the period from a maximum load factor of each load of the combination; and repeating each processing until all maximum load factors of each of the loads become zero to perform automatic allocation processing of power supply to each of the loads.

(Configuration 2)

The power control device according to Configuration 1, including a processing of calculating an integrated value obtained by integrating periods where each of the loads are simultaneously ON-controlled, and performing an error processing when a maximum load factor of all of the loads could not be set to zero before the integrated value reaches a predetermined value.

(Configuration 3)

The power control device according to Configuration 1 or 2 in which, in the processing of calculating a combination of the loads which does not exceed the limiter value, the combination of the loads is selected from those having a large current value upon the ON-control.

(Configuration 4)

A method of allocating power supply to each of a plurality of loads by a time-proportional control used to supply power to each of the loads, in which a maximum load factor and a current value or a power value during ON-control are associated with each of the plurality of loads, the method including the steps of: calculating a combination of the loads in which a total value of a current value or a power value during ON-control associated with each of the loads does not exceed a limiter value that specifies an upper limit to a total of a current value or a power value output to the plurality of loads; setting a period in which each load of the combination is simultaneously ON-controlled and subtracting the period from a maximum load factor of each load of the combination, and calculating an integrated value where periods to simultaneously ON-control each of the loads are integrated; repeating each of the steps to allocate power control to each of the loads; and issuing an error when a maximum load factor of all of the loads could not be set to zero before the integrated value reaches a predetermined value.

(Configuration 5)

An automatic allocation program of power supply to each of a plurality of loads in time-proportional control used for power supply to each of the loads, in which a storage unit associates a maximum load factor and a current value or a power value at ON-control with each of the plurality of loads; and a calculation unit is configured to execute the steps of: calculating a combination of the loads in which a total value of a current value or a power value during ON-control associated with each of the loads does not exceed a limiter value that specifies an upper limit to a total of a current value or a power value output to the plurality of loads; setting a period in which each load of the combination is simultaneously ON-controlled and subtracting the period from a maximum load factor of each load of the combination, and calculating an integrated value where periods to simultaneously ON-control each of the loads are integrated; repeating each of the steps to automatically allocate power control to each of the loads; and issuing an error when a maximum load factor of all of the loads could not be set to zero before the integrated value reaches a predetermined value.

Effect of the Invention

According to the power control device, the power supply allocation method, and the power supply allocation program of this invention, regarding the power control in which the power supply to each of a plurality of loads is performed by time-proportional control, the allocation of the power supply to each load can be facilitated so that a current value or a power value falls within a predetermined upper limit value.

EMBODIMENT FOR CARRYING OUT THE INVENTION

The embodiment of this invention is described concretely below together with the drawings. Incidentally, the embodiment given below is one of the embodiments upon embodying this invention and is not intended to limit the invention within such a scope.

Figure 1:
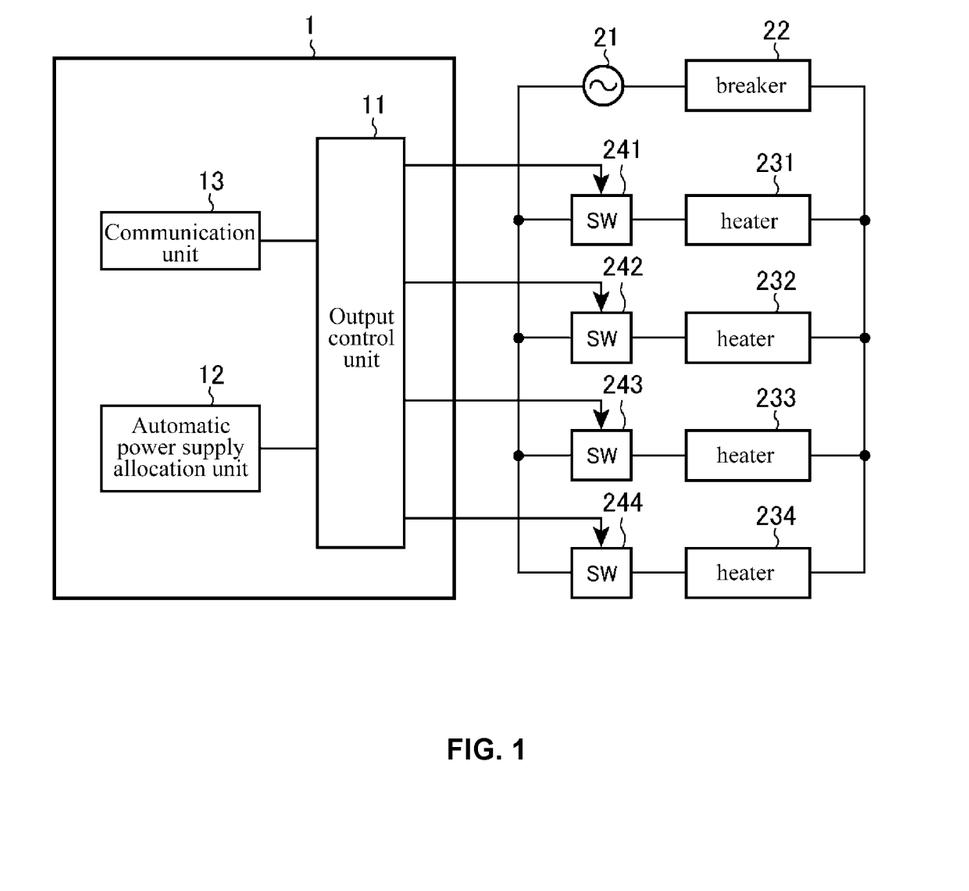
FIG. 1 is a block diagram schematically illustrating a configuration of this invention of a heating system of an embodiment of this invention.

FIG. 1 is a block diagram schematically showing a configuration of this invention of the system according to this embodiment.

The system of this embodiment is a system for controlling a plurality of loads, or heaters (four heaters herein for simplification) provided in an apparatus such as a semiconductor manufacturing apparatus or an injection molding machine.

The system of this embodiment is provided with heaters 231 to 234, an AC power source 21 for supplying power to each load, switching elements SW241 to SW244 for turning on/off power supply to each heater, a breaker 22 provided on a power supply path from the AC power source 21 to each heater to protect circuit, etc. from overload, short circuit, etc., and a power control device 1 for controlling power supply to each heater by on/off control of each switching element.

The power control device 1 receives an input of an operation output value MV from other devices such as a temperature controller, and based on an operation output value MV, performs power supply to each of the heaters 231 to 234 by time-proportional control (control for changing an on/off ratio of output in proportion to MV as a result of PID calculation, etc.).

The power control device 1 includes an output control unit 11 which performs on/off control of the switching elements SW241 to SW244 by time-proportional control, an automatic power supply allocation unit 12 which automatically allocates power supply to each heater, and a communication unit 13 which transmits/receives information to/from other devices such as a temperature controller.

In the power control device 1, a maximum load factor and a current value upon ON control are associated with each of the heaters 231 to 234, and the automatic allocation processing of power supply to each heater is performed by repeating a processing of calculating a combination of the heaters in which a total value of current values upon ON control associated with each heater does not exceed a limiter value defining an upper limit of a total current value output to each heater, and a processing of setting a period for simultaneously controlling each heater of the combination to ON and subtracting the period from a maximum load factor of each heater of the combination.

"Maximum load factor" set for each of the heaters 231 to 234 is a value for determining an upper limit (i.e., output limiter) of a load factor (ratio of ON period to a control cycle) of each heater, and is a value set between 0 and 100%. The heaters 231 to 234 are basically for heating an object to a certain temperature, and a load factor in a steady state (state of reaching a certain temperature) is referred to as a stable load factor. "Maximum load factor" is set at least greater than the stable load factor. In this embodiment, a value obtained by multiplying the stable load factor by a predetermined coefficient is set as "maximum load factor".

"Current value upon ON control" set to each of the heaters 231 to 234 is a current value flowing through each of the heaters 231 to 234 when ON control is performed by time-proportional control.

"Maximum load factor" and "current value upon ON control" are set based on a stable load factor and a current value measured upon auto-tuning, etc.

"Limiter value defining an upper limit of a total current value output to each heater" defines an upper limit of a total current value flowing through the heaters 231 to 234, which is set in advance in the apparatus by a user, etc.

If the upper limit of the total current value flowing through the heaters 231 to 234 can be kept low, the capacity of the breaker 22 and the basic charge of electric power can be reduced (reduction of contract capacity).

Figure 2:
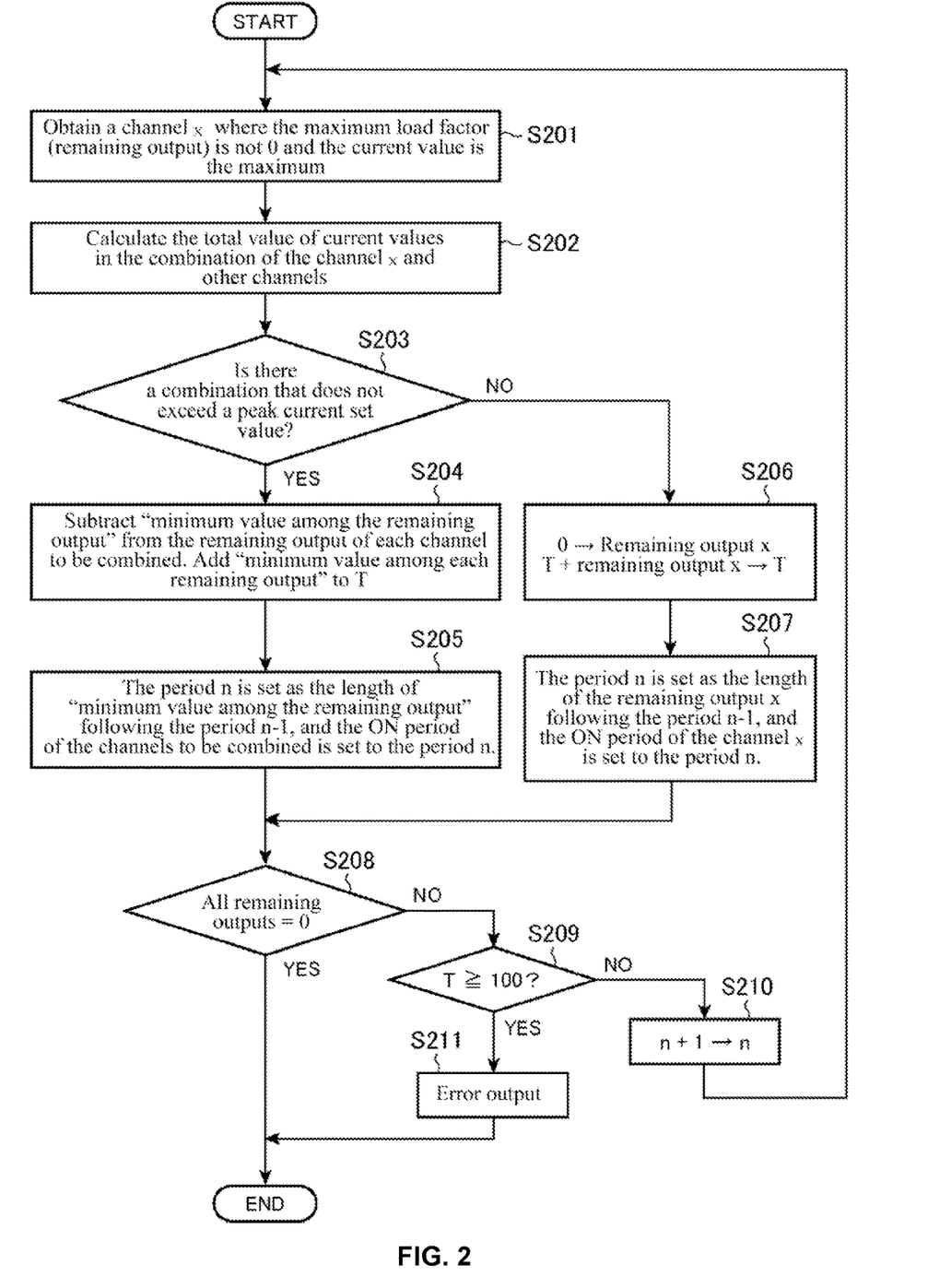
FIG. 2 is a flowchart outlining the processing operation of the power control device of the embodiment.

FIG. 2 is a flowchart outlining the processing operations of this invention of the power control device 1. Further, FIGS. 4-7 are diagrams for explaining an example of the processing progress of the power control device 1.

Referring to the flowchart of FIG. 2 and FIGS. 4 to 7, the automatic allocation processing of power supply to each heater in the power control device 1 will be described below.

The systems of the heater 231 to the heater 234 are distinguished as "channels". The channels 1 to 4 correspond to the heaters 231 to 234.

Figure 3:
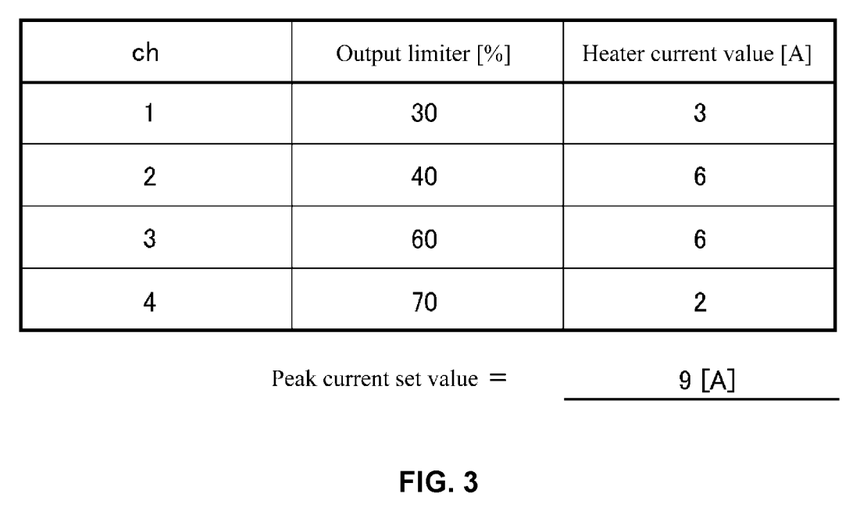
FIG. 3 is a diagram showing an example of a set value set in the power control device.

FIG. 3 shows an example of "maximum load factor (output limiter)" and "current value (heater current value) upon ON control" set in the power control device 1.

Further, 9A is set as an example of "limiter value (peak current set value) specifying an upper limit of total current value output to each heater".

In the processing of FIG. 2, the automatic power supply allocation unit 12 automatically allocates the power supply timing to each channel (heater) based on a set value illustrated in FIG. 3.

When the processing of FIG. 2 is executed, 1 is assigned to variable n and 0 is assigned to variable T as an initialization processing (not particularly shown).

In Step 201 after the initialization processing, a channel X is acquired in which a maximum load factor (remaining output) is not 0 and a current value (heater current value) upon ON control is the maximum. In the example of FIG. 3, the channels 2 and 3 correspond thereto. When a plurality of channels correspond as described above, one of the channels is selected. The method of selection may be arbitrary, such as one selected at random, one selected in the order of channel number, one selected in the order of larger maximum load factor (remaining output), etc.

Explanation is made herein assuming that the channel 3 is selected.

Next, a processing of calculating a total value of current values in a combination of the channel X and other channels is performed (Step 202).

Figure 4A:
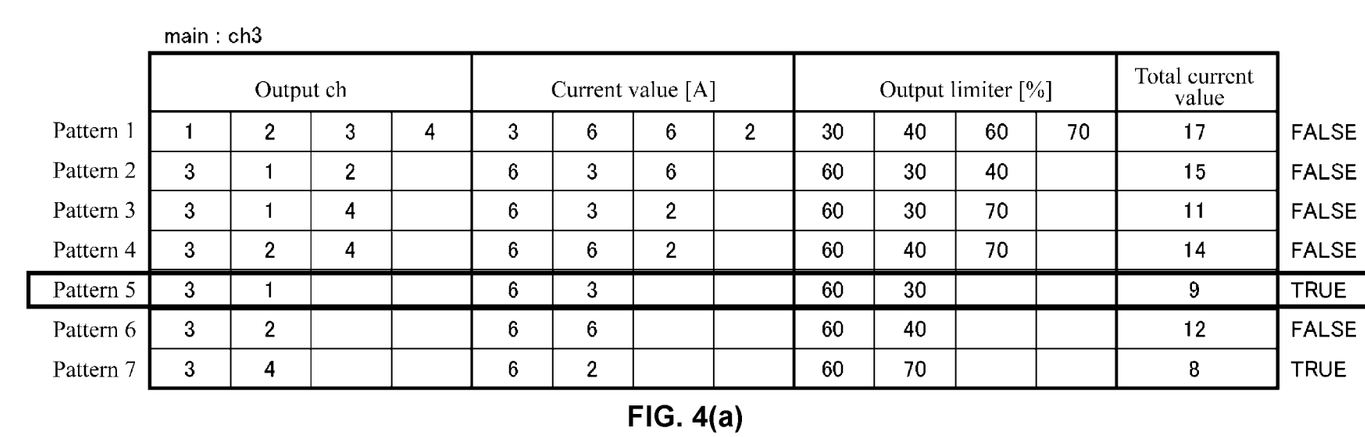
FIG. 4 is a diagram for explaining an example of the processing progress of the power control device.

FIG. 4(a) shows an example of the processing result of Step 202. For the channel 3 selected in Step 201, patterns 1 to 7 are created as combinations of each channel, and a total of current values (heater current values) upon ON control is calculated for each pattern.

In the subsequent Step 203, determination is made whether there is a combination in which a total of heater current values is equal to or less than a peak current set value ("9A" in this embodiment) among the patterns obtained in the Step 202. In the example of FIG. 4(a), the pattern 5 (combination of channels 3 and 1) and the pattern 7 (combination of channels 3 and 4) correspond thereto. When a plurality of combinations corresponds as described above, any one of the combinations is selected. The method of selection may be arbitrary, such as selecting from those containing a channel having a large heater current value (channel with the highest heater current value other than channel X selected in Step 201), selecting from those having the largest total current value, randomly selecting, selecting in pattern number order, and selecting from those containing a channel having a large maximum load factor (remaining output).

Explanation is made herein assuming that the combination of the pattern 5 is selected.

When there is a combination in which a total of heater current values is equal to or less than a peak current setting value, "minimum value among the remaining output" is subtracted from the remaining output of the respective channels to be combined, and "minimum value among each remaining output" is added to integrated value T obtained by integrating the periods during which the respective heaters are simultaneously ON-controlled (Step 203: Yes→Step 204).

Figure 5A:
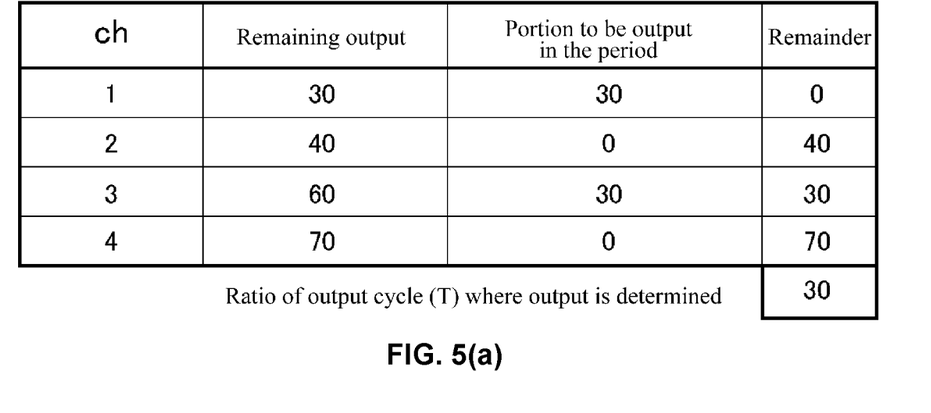
FIG. 5 is a diagram for explaining an example of the processing progress of the power control device.

"Minimum value among the remaining output" is a minimum value of the remaining output of the respective channels to be combined, namely, the maximum length that each channel to be combined can be simultaneously turned on. In this example in which a combination of the channels 3 and 1 is selected, since the remaining output of the channel 3 is 60% and the remaining output of the channel 1 is 30% as shown in FIG. 5(a), "minimum value among the remaining output" is 30%.

Accordingly, in the processing of Step 204, 30 is subtracted from the remaining outputs of the channels 3 and 1, respectively, and 30 is integrated into integrated value T. The rightmost row in FIG. 5(a) is the processing result.

"Integrated value T obtained by integrating the periods during which the heaters are simultaneously turned on" will be apparent from the following description, in which the allocated periods in the control cycle are integrated. For example, integrated value T=70(%) indicates that "70% of the control period (100%) has been allocated".

In the subsequent Step 205, the period n is set as a length of "minimum value among the remaining output" following the period n−1, and the ON period of the channels to be combined is set to the period n.

In the above example, the period 1 is set to a length of "minimum value among the remaining outputs"=30%, and in the period 1, the ON periods of the channels 3 and 1 are set. This is conceptually illustrated in FIG. 6(a).

"Remaining output" is the remainder obtained by subtracting a load factor to which an ON period has been allocated from a maximum load factor in the processing of Steps 204 and 205 as described above.

If it is determined in Step 203 that there is no channel that can be combined with the channel X selected in Step 201, the processing proceeds to Step 206, where the remaining output of the channel X is set to 0 (remaining output of the channel X−remaining output of the channel X=0), and the remaining output of the channel X is integrated into integrated value T.

In the subsequent Step 207, the period n is set as a length of the remaining output of the channel X following the period n−1, and the ON period of the channel X is set to the period n.

Namely, in the processing of Steps 206 and 207, a period during which the channel X is independently turned on (all of the remaining outputs of the channel X) is allocated.

As can be understood from the processing of Step 206, the term "the period for simultaneously ON-controlling each heater" in "the integrated value T obtained by integrating the periods for simultaneously ON-controlling each heater" means the period for ON-controlling one heater when there is no channel that can be combined.

The processing of Steps 208 to 211 following Steps 203 to 207 is a processing of ending/continuing the assignment and determining whether the assignment is impossible.

In Step 208, it is determined whether the remaining outputs of all the channels have been set to 0, and if the remaining outputs of all the channels have been set to 0, the processing is terminated on the assumption that the assignment has been completed.

In Step 209, it is determined whether the integrated value T has become 100%, and if the integrated value T has become 100%, an error is output as unassignable (Step 209: Yes→Step 211). Namely, when the maximum load factor of all the loads could not be set to 0 until the integrated value reaches a predetermined value (100%), error processing is performed.

On the other hand, if 100% has not been reached, the processing proceeds to Step 210, n is incremented, and the processing proceeds to Step 201 (processing is continued).

Continuing the description of the above example, a NO determination is made in both Steps 208 and 209, the processing proceeds to Step 210, n is incremented (n=2), and the processing returns to Step 201 to continue the processing.

Figure 4B:
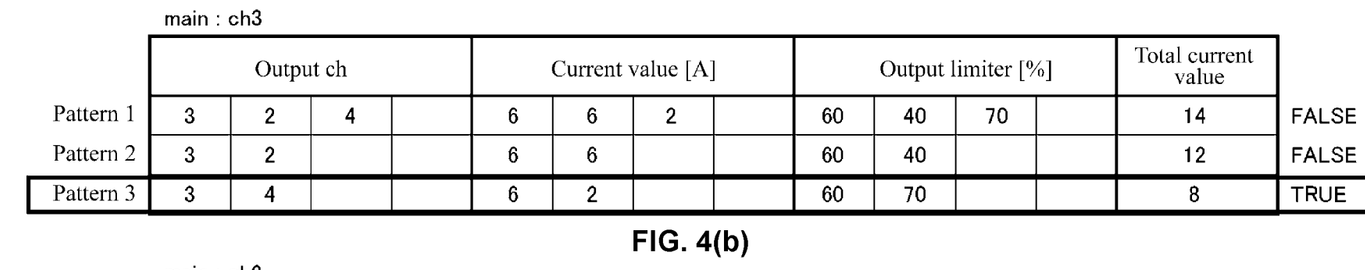
Figure 5B:
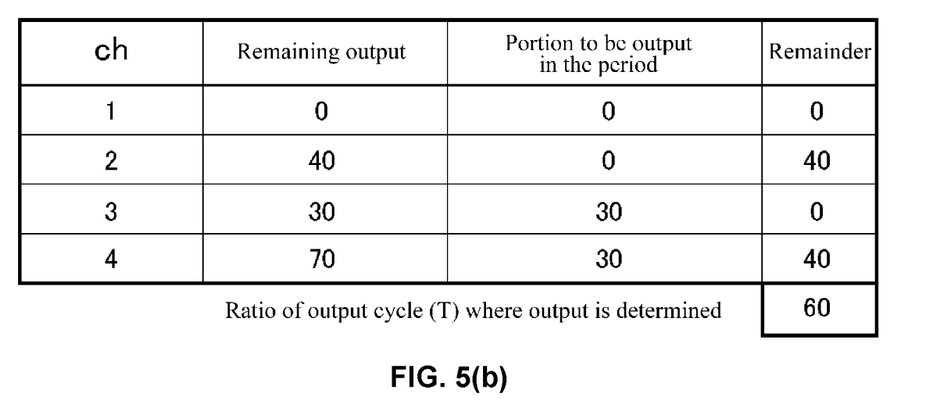

In Step 201, the channel 3 is again selected, and the result of FIG. 4(b) is obtained by the subsequent processing in Step 202. Since the combination of the channels 3 and 4 of the pattern 3 in FIG. 4(b) does not exceed the peak current set value, the processing proceeds from Step 203 to Step 204. As shown in FIG. 5(*b*), since the remaining output of the channel 3 is 30% and the remaining output of the channel 4 is 70%, "minimum value among the remaining outputs" is 30%. Accordingly, in the processing of Step 204, 30 is subtracted from the remaining outputs of the channels 3 and 4, respectively, and 30 is integrated into the integrated value T. The right end row in FIG. 5(*b*) is the processing result.

Figure 6A:
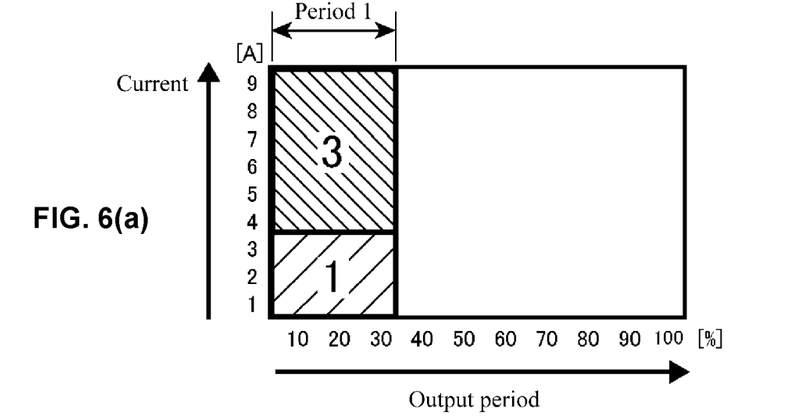
FIG. 6 is a diagram for explaining an example of the processing progress of the power control device.
Figure 6B:
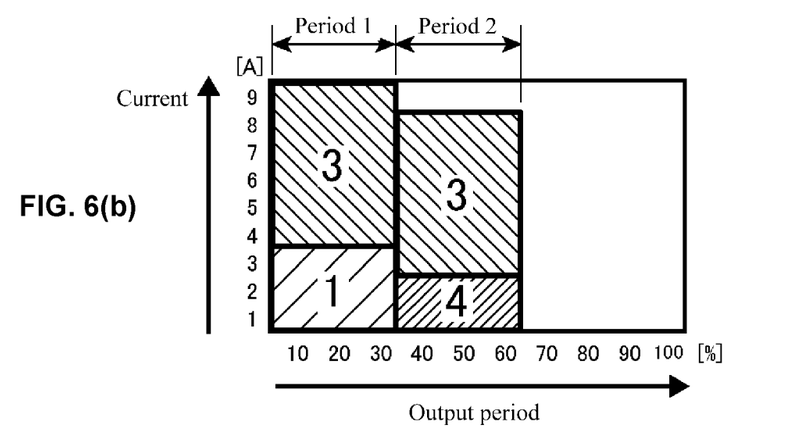

In the subsequent Step 205, the period 2 is set to have a length of 30% following the period 1, and the ON periods of the channels 3 and 4 are set in the period 2 (FIG. 6(*b*)).

Subsequently, a NO determination is made in Steps 208 and 209, the processing proceeds to Step 210, n is incremented (n=3), and returns to Step 201 to continue the processing.

Figure 4C:
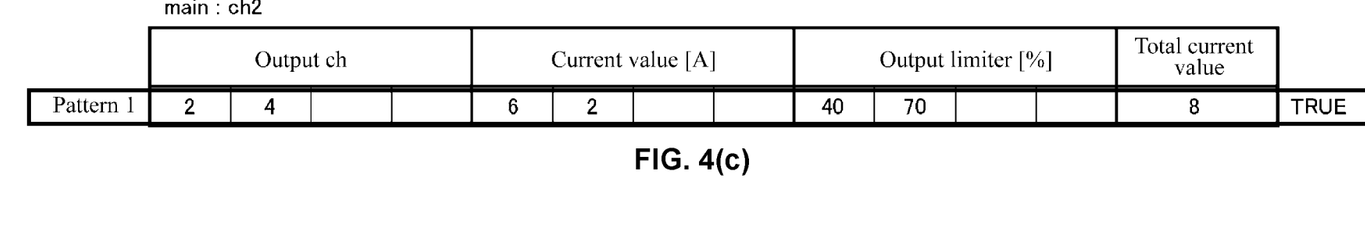
Figure 5C:
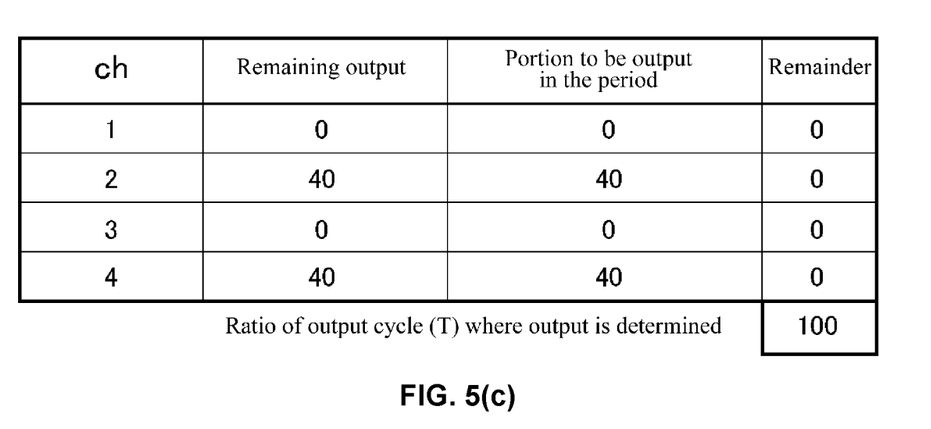

In Step 201, the channel 2 is selected, and the result of FIG. 4(*c*) is obtained by the subsequent processing in Step 202. Since the combination of the channels 2 and 4 of the pattern 1 in FIG. 4(*c*) does not exceed a peak current set value, the processing proceeds from Step 203 to Step 204. As shown in FIG. 5(*c*), since the remaining output of the channel 2 is 40% and the remaining output of the channel 4 is 40%, "minimum value among the remaining outputs" is 40%. Accordingly, in the processing of Step 204, 40 is subtracted from the remaining outputs of channels 2 and 4, respectively, and 40 is integrated into the integrated value T. The right end row in FIG. 5(*c*) is the processing result.

Figure 6C:
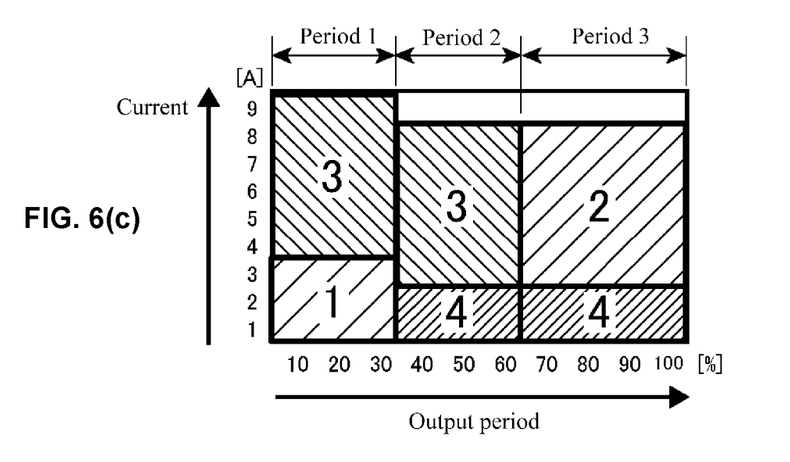

In the subsequent Step 205, the period 3 is set to have a length of 40% following the period 2, and the ON periods of the channels 2 and 4 are set in the period 3 (FIG. 6(*c*)).

As a result of the above processing, the remaining outputs of all channels become 0, so that the determination in the subsequent Step 208 becomes YES, and the assignment processing is completed.

Figure 7:
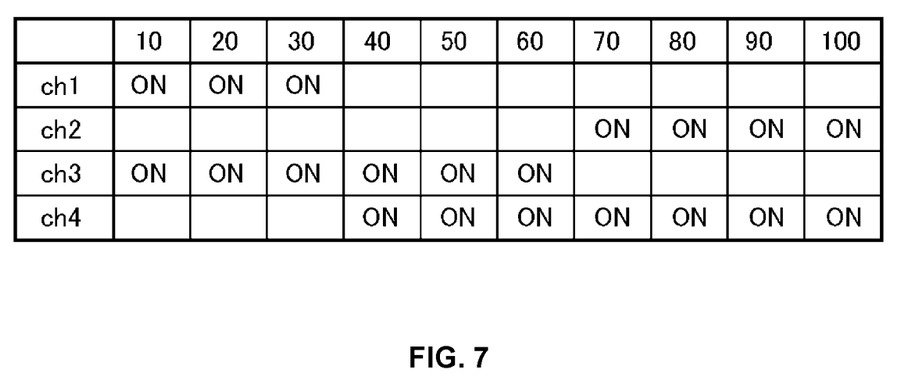
FIG. 7 is a diagram for explaining an example of a processing result of the power control device.

FIG. 7 shows the assignment result in the above example.

In the above example, when the maximum load factor (output limiter) of the channel 2 is 50%, for example, since the determination in Step 208 is NO and the determination in Step 209 is YES in the processing of n=3, an error is output as unassignable.

As described above, according to the power control device 1 of this embodiment, with respect to power control in which power is supplied to each of a plurality of loads by time-proportional control, the power supply can be automatically allocated to each load so that the current value falls within a predetermined upper limit value.

Thus, the capacity of the breaker and the contract capacity of the electric power can be set to an efficient capacity.

In addition, according to the power control device 1 of this embodiment, the channel having the largest current value (heater current value) upon ON-control is acquired in Step 201, and the channel is selected from those having larger current value upon the ON control. This allows for efficient processing.

In this embodiment, "current value" upon ON control is set as an example; however, "power value" upon ON control may be set. The processing concept is the same as those described in this embodiment.

Further, while value of 0 to 100% (normalized value) corresponding to the load factor is used as the integrated value T obtained by integrating the periods of ON control, the present invention is not limited thereto. For example, it is possible to determine whether the integrated value T (ms) reaches the control period (ms) in the determination in Step 209 using the time (ms) for the ON control as a unit.

While the power control device has been described in this embodiment as including the output control unit 11, the automatic power supply allocation unit 12, and the communication unit 13, each functional unit is not limited to being individually configured as hardware, and all functions may be implemented as software in one device such as a microcomputer, etc. Conversely, any or all of the respective functional units may be implemented in hardware (through dedicated circuits, etc.), and a part or all of the functions described as processing executed in software on the automatic power supply allocation unit 12 in this embodiment may be implemented in hardware.

Further, in this embodiment, while the automatic allocation processing of the power supply timing to each channel (heater) described above is performed by the power control device 1 (automatic power supply allocation unit 12) as an example, the processing may be performed by an external information processing apparatus such as a PC, and the obtained allocation result may be set in the power control device 1.

DESCRIPTION OF REFERENCE NUMERALS

1 . . . power control device
11 . . . output control unit
12 . . . automatic power supply allocation unit
231 . . . heater (load)

The invention claimed is:

1. A power control device that performs power supply to each of a plurality of loads by a time-proportional control, wherein a maximum load factor and a current value or a power value during ON-control are associated with each of the plurality of loads, the power control device comprising an automatic power supply allocation unit that is programmed to perform:
a processing of calculating a combination of the loads wherein a total value of a current value or a power value during ON-control associated with each of the loads does not exceed a limiter value that specifies an upper limit to a total of a current value or a power value output to the plurality of loads;
a processing of setting a period wherein each load of the combination is simultaneously ON-controlled based on a minimum value among remaining output of the maximum load factor of each load of the combination and subtracting the period from a maximum load factor of each load of the combination; and
repeating each processing until all maximum load factors of each of the loads become zero to thereby automatically allocate a supply of power among the loads.

2. The power control device according to claim 1, comprising a processing of calculating an integrated value obtained by integrating periods where each of the loads are simultaneously ON-controlled, and performing an error processing when a maximum load factor of all of the loads could not be set to zero before the integrated value reaches a predetermined value.

3. The power control device according to claim 1 wherein, in the processing of calculating a combination of the loads which does not exceed the limiter value, the combination of the loads is selected from those having a current value that is at least as large as the current values of the other loads upon the ON-control.

4. A method of allocating power supply to each of a plurality of loads by a time-proportional control used to supply power to each of the loads, wherein a maximum load factor and a current value or a power value during ON-control are associated with each of the plurality of loads, the method comprising the steps of:

calculating a combination of the loads wherein a total value of a current value or a power value during ON-control associated with each of the loads does not exceed a limiter value that specifies an upper limit to a total of a current value or a power value output to the plurality of loads;

setting a period wherein each load of the combination is simultaneously ON-controlled based on a minimum value among remaining output of the maximum load factor of each load of the combination and subtracting the period from a maximum load factor of each load of the combination, and calculating an integrated value where periods to simultaneously ON-control each of the loads are integrated;

repeating each of the steps to thereby automatically allocate a supply of power to each of the loads; and issuing an error when a maximum load factor of all of the loads could not be set to zero before the integrated value reaches a predetermined value.

* * * * *